March 23, 1965    J. R. COX ETAL    3,174,766
ADJUSTABLE TOOL HOLDER
Filed Jan. 16, 1963

INVENTORS.
JOHN R. COX
BY LARRY F. SMREKAR.
Bosworth, Sessions,
Herrstrom & Knowles
ATTORNEYS.

3,174,766
ADJUSTABLE TOOL HOLDER
John R. Cox, Lakewood, and Larry F. Smrekar, Solon, Ohio, assignors to Balas Collet Manufacturing Co., Cleveland, Ohio, a corporation of Ohio
Filed Jan. 16, 1963, Ser. No. 251,856
6 Claims. (Cl. 279—6)

This invention relates to tool holders and more particularly to an improved adjustable tool holder for use in connection with metal working machine tools.

In lathes or the like where the workpiece is carried by the rotating spindle of the machine it is frequently desired to mount a drill or other tool on the tail stock of the machine for longitudinal feed toward and away from the rotating workpiece. For accurate work it is normally essential that the tool and the workpiece be axially aligned but it frequently occurs that, due to wear or for other reason there is a slight misalignment between the center of rotation of the machine spindle and the center of the center line of the chuck which holds the tool.

In order to correct such misalignment between the tool and the workpiece adjustable tool holders have been devised whereby the center line of the tool can be shifted to a limited degree in order to bring it into accurate alignment with the center of rotation of the work and which, after being so adjusted, can be locked in position by a clamping means. Difficulty, however, has been experienced with devices of this type because upon tightening the clamping means after accurate alignment of the parts the tool support member and clutch shift out of the position in which they have been set and out of the desired alignment.

In the previously proposed adjustable tool holders of the type contemplated herein screw threaded clamping means have been employed. Due to the unavoidable clearance in the threads of the screws of such devices, and due to the torque imposed upon the parts during tightening of the threaded clamping devices, shifting of the adjusted position of the tool holder after it has been properly aligned and upon tightening of the clamping means frequently occurs.

It is the primary object of the present invention to provide an adjustable tool holder whereby no such shifting of the parts will occur upon tightening after adjustment. A further object of the invention is the provision of an adjustable tool holder which eliminates all threaded clamping devices, which may be accurately set in aligned position and which, when clamped, will be firmly held therein, which is rugged in design and construction, and which is not susceptible to wear during use which will interfere with its effective operation.

The above and other objects of our invention will appear from the following description of a preferred embodiment thereof, reference being had to the accompanying drawings in which.

Figure 1:
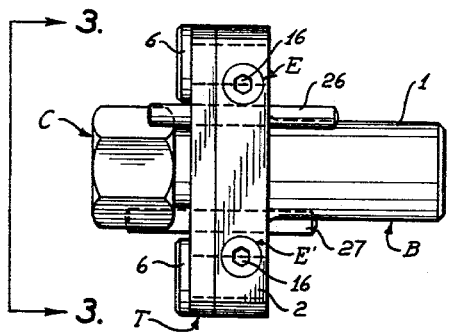
FIGURE 1 is a side elevational view of our adjustable tool holder, the parts being shown clamped in centered position with the chuck aligned with the shank of the tool holder and with the aligning rods in position.
Figure 2:
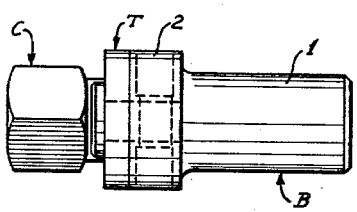
FIGURE 2 is a plan view of the device of FIGURE 1, the aligning rods being omitted.

Our adjustable tool holder as illustrated in the drawings includes a bracket member B having a cylindrical shank portion 1 and a transversely extending cross head portion 2. The tool support member has a smooth flat inner face portion 3 which engages the smooth flat outer face portion 4 of the cross head portion 2 of the bracket member B and tool carrying means in the form of chuck C extends outwardly from the outer face of the tool support member T and is adapted to hold a drill or other tool.

It will be understood that when in use the shank 1 of our tool holder will be secured to the tail stock of the machine and the tool which is held by the chuck C will extend toward the workpiece mounted on the rotating spindle of the machine. In order adjustably to secure the tool support member T to the bracket member B I provide a pair of clamp pins P and P' each of which has a shank portion 5 and an enlarged head portion 6. The shank portions 5 of pins P and P' have close sliding fits in clamp pin receiving holes 7 and 8 which, as best seen in FIGURE 4, form bearings for shank portions 5 and extend through the cross head portion 2 of bracket member B adjacent the opposite ends thereof and normal to said flat face 4.

In order to permit limited adjusting movement of the tool support member T on and relative to the bracket B the clamp pin receiving holes 9 and 10 in member T, through which the clamp pins P and P', respectively, extend, are made larger in diameter than the shank portions 5 of these pins. The enlarged head portion 6 of pins P and P' engage the outer face 11 of tool support member T at the outer ends of the clamp pin receiving holes 9 and 10 which, as noted above, are larger than said shank portions of said clamp pins P and P'. As will appear later, the head portions 6 act to move the face 3 of tool support T into clamped engagement with the face 4 of bracket member B.

Figure 4:
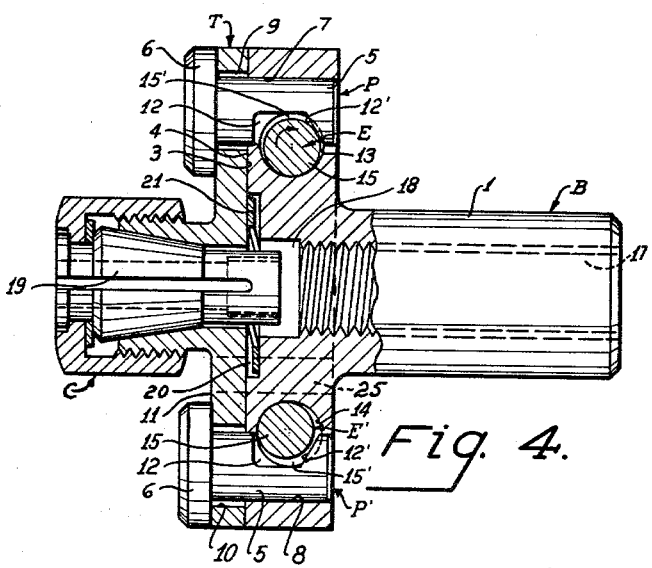
FIGURE 4 is an enlarged vertical cross sectional view taken substantially on line 4—4 of FIGURE 3.
Figure 5:
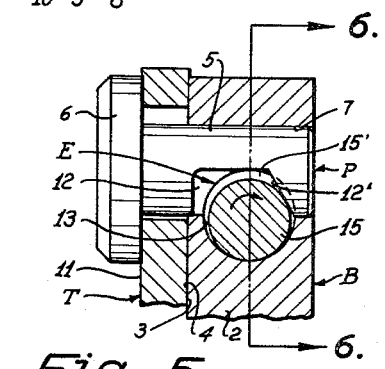
FIGURE 5 is an enlarged vertical cross sectional view showing one of the clamp pins, the tool support member being clamped in an adjusted non-centered position relative to the bracket member.

In order to provide means for moving the pins P and P' to the right (as seen in FIGURE 4) with purely lineal movement and without any turning or rotary movement thereof so that there will be no torque or twisting action on the tool support member T during tightening, the shank portions 5 of these pins are recessed intermediate their ends as seen at 12 in FIGURES 4 and 5. The wall portion or face 12' of each of these transversely extending recesses 12 is flat and is inclined to and extends transversely of the longitudinal axis of the clamp pin of which it is a part.

Clamping cam members, generally indicated at E and E', extend through bores 13 and 14, respectively, in the cross head portion 2 of bracket B. These bores 13 and 14 extend transversely of the axes of the pins P and P' and are so disposed that at least a part of the central off-set or eccentric portion 15 of each of the clamping cams E and E' lies within the recess 12 in the pins P and P', respectively.

At one end of each of the clamping cams E and E' there is a hexagonal recess or socket 16 adapted to receive an Allen type wrench whereby the clamping cams E and E' may be rotated. The off-set eccentric portions 15 of members E and E' are cylindrical but of smaller diameter than the end portions 15' thereof. As clearly seen in FIGURE 5, the portion 15 of cam member E is tangent to the end portions 15' whereby rotation of member E will cause the off-set portions 15 to move about the longitudinal axis of portions 15'.

The inclined surface 12' of the pin P is so disposed relative to the off-set portion 15 of the cam member E that when the cam member E is rotated into the position seen in FIGURE 5 the off-set portion 15 thereof will engage face 12' of pin P and force same to the right, causing the head 6 to clamp the tool support member T firmly against the face of the cross head portion 2 of bracket B. The clamping action seen in FIGURE 5 (and at the top of FIGURE 4) is effected by rotation of the cam member E in clockwise direction as indicated by the arrow. Because of the proportions of the parts, the off-set cam portion 15 will become jammed and locked in the position seen in FIGURE 5 and further rotation of member E in clockwise direction will not be possible. It will be understood that the action of cam member E' on clamp pin P' will be the same as that described above.

At the lower part of FIGURE 4 clamping cam E' is shown as having been rotated in counter-clockwise direction from its clamping position to release the off-set or cam portion 15 thereof from engagement with the inclined surface 12' of pin P', thus permitting this pin to release its clamping action on the tool support member T. It will be apparent that clamping action of the eccentrics E and E' can be obtained by rotation thereof from released position in either direction as there are two angular positions of off-set cam portions 15 where they will be jammed against inclined surfaces 12' and will cause pins P and P' to clamp the tool support member T to the bracket B.

The shank portion 1 of bracket B is bored and threaded as seen at 17 and the cross head portion 2 is counterbored at 18 to receive the inner end of the collet 19. An additional shallow counterbore 20 is formed at the outer face of the cross head portion 2 and a spring washer 21 is disposed in this counterbore 20 between the cross head portion 2 and the inner face of the tool support member T. This spring washer 21 is axially resilient and is held under compression so that, when the clamping eccentrics E and E' are released, it will tend to move the tool support member T away from bracket member B and hold same against the heads 6 of clamp pins P and P'. This spring 21 is effective in providing frictional engagement of tool support member T with the heads 6 of pins P and P' which, while permitting member T to be shifted and moved to effect centering thereof relative to the center of the work supporting spindle, will also hold the member T in any adjusted position until it is firmly clamped therein.

Figure 6:
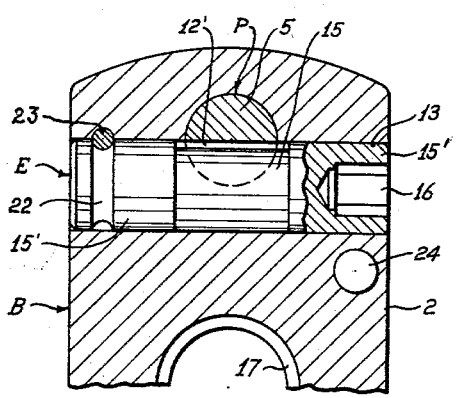
FIGURE 6 is a cross sectional view taken substantially on line 6—6 of FIGURE 5.

As seen in FIGURE 6, the end of each clamping cam member E and E' opposite the socket 16 is grooved as seen at 22 and a fastening pin 23 is driven into a suitable hole in the cross head portion 2 of bracket B. This pin 23 has a tight driving fit in the cross head 2 but has a relatively loose fit in the grooves 22 so as to permit free rotation of cam members E and E' while restricting them against endwise movement and retaining the members P, P', E and E' in assembled position in the device.

The operation of the above described mechanism will now be explained. Assuming that the shank 1 of bracket member B is mounted on the tail stock of a lathe and that it is desired accurately to align or center a tool that is chucked in the chuck C with the center of rotation of the work which is carried by the rotatable spindle of the machine, the cam members E and E' are both turned to the released position in which member E' is shown in FIGURE 4. The spring 20 will now hold the face 3 of tool support member T away from the face 4 of cross head portion 2 of bracket B. The pins P and P' will also be moved slightly to the left by the action of spring 20 and, due to the clearance between the holes 9 and 10 in tool support member T and the shank portions 5 of pins P and P', the center line of the chuck C can be moved around to a limited degree in any direction and, by suitable gauges or observations, can be accurately aligned with the center of the work supporting spindle of the machine tool.

When this aligning adjustment has been made the clamping cam members E and E' are turned by a wrench placed in sockets 16 (in either direction as noted above) so that the off-set or eccentric portions 15 thereof engage their adjacent inclined faces 12' of the respective pins P and P' and move these pins to the right causing the heads 6 thereof firmly to clamp the tool support member T to the cross head portion 2 of bracket B. Because of the wedging action of the eccentric portions 15 against the inclined surfaces 12' a very strong clamping force may be imposed without difficulty and, after the clamping cams E and E' are tightened, any displacement of the tool support member T from its adjusted position is effectively prevented.

Figure 3:
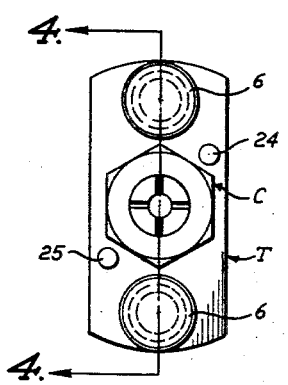
FIGURE 3 is an end view, taken substantially on line 3—3 of FIGURE 1, the aligning rods also being omitted.

In FIGURE 5 tool support member T is seen in an adjusted position where it is elevated somewhat relative to its normal or centered position as seen in FIGURE 4. In order to enable the user to set our adjustable tool holder in position with the center line of the chuck C accurately aligned with the center line of the shank 1 we provide two sets of alignment holes 24 and 25. As seen in FIGURE 3, these holes are disposed on opposite sides of the center line of the tool holder assembly and, as seen in FIGURES 1 and 4 they are drilled through both the cross head 2 of bracket B and the tool support member T while these two parts are held in aligned position.

Now, when it is desired to set the tool holder so that the chuck C is aligned with the shank 1, it is only necessary to release the clamping cams E and E', move the tool support member T relative to cross head 2 until the two sets of pairs of holes 24 and 25 are coaxially aligned, insert the aligning rods 26 and 27 into holes 24 and 25 in which they have close sliding fits, and then tighten the clamping cams E and E' firmly to secure the tool support member T and chuck C in coaxially aligned or centered position relative to the shank 1 of the assembly. Of course, when any adjustment other than this centered adjustment is desired the pins 26 and 27 will be removed.

From the above description it will be understood that the clamping action of our clamp pins P and P' is exerted entirely in a direction normal to the plane of engagement of the tool support member T with the face of bracket B. No torque or twisting effect whatsoever is imposed upon the parts because the pins P and P' move in pure lineal travel without rotational movement and there are no threaded connections which, due to looseness or inaccuracy, might cause shifting during tightening. Thus, with our improved device only one centering operation is necessary to obtain the desired alignment and, after the proper relation is obtained between the center line of chuck C and the center line of the machine spindle, the tool holder unit may be clamped up without fear of any shifting or changing of the adjustment. Furthermore, with our apparatus there are no parts which, due to wear, might cause a change in the operation of the device. Thus, if the off-set portions 15 of cam members E and E' or the inclined faces 12' of pins P or P' should wear the only result would be the necessity for a slightly greater rotation of the pins P and P' in order to effect the desired clamping action.

Although we have described the illustrated embodiment of our invention in considerable detail it will be understood that variations and modifications in the particular form, arrangement and proportions of the parts may be made without departing from the spirit of our invention. For example, the clamp pins P and P' might be so disposed that the enlarged heads 6 engage the bracket member B instead of engaging the tool support member T. With such an arrangement the clamping cam members E and E' and the bores 13 and 14 in which they are supported would be formed in the tool support member T. In like manner, in such a modified arrangement, the enlarged holes 9 and 10 would be in the bracket member B. Such a transposition of the positions of the parts would not change the operation of the device and is believed to be readily understandable from the above description without detailed illustration in the drawings.

In view of the above we do not wish to be limited to the exact structure shown in the drawings but claim as our invention all embodiments thereof coming within the scope of the appended claims.

We claim:

1. An adjustable tool holder including a bracket member having a flat face portion and a clamp pin receiving hole, a tool support member having a flat face portion adapted to engage said flat face portion of said bracket member, said tool support member having a clamp pin receiving hole adapted to be aligned with said clamp pin receiving hole in said bracket member, tool carrying means carried by said tool support member, a clamp pin having an enlarged head portion and a shank portion extending into said clamp pin receiving holes, one of said clamp pin receiving holes being larger in diameter than said shank portion of said clamp pin to permit limited adjusting movement of said tool support member relative to said bracket member and the other of said clamp pin receiving holes forming a bearing for said shank portion of said clamp pin, said enlarged head portion of said clamp pin being disposed at the outer end of the clamp pin receiving hole which is larger than said shank portion of said clamp pin, said shank portion of said clamp pin having a transversely extending recess a wall portion of which is inclined to the axis of said clamp pin, and a clamping cam member rotatably supported in a bore which extends transversely of and intersects the clamp pin receiving hole which forms a bearing for said clamp pin, said cam member having an eccentric portion disposed at least partially within said recess in said clamp pin, said eccentric portion being adapted, when said cam member is rotated, to engage said inclined wall portion of said recess and move said clamp pin axially to effect clamping between said flat face portions of said tool support member and said bracket member.

2. An adjustable tool holder as defined in claim 1 wherein said clamp pin and clamping cam member are disposed on one side of the center line of said tool carrying means and a second clamp pin and clamping cam member is similarly arranged and disposed on the opposite side of said center line.

3. An adjustable tool holder as defined in claim 1 wherein resilient spring means are interposed between said bracket member and said tool support member tending to urge same apart.

4. An adjustable tool holder including a bracket member having a shank portion and a transversely extending cross head portion, said cross head portion having a flat face portion and a clamp pin receiving hole extending therethrough normal to said flat face portion, a tool support member having a flat face portion adapted to engage said flat face portion of said cross head portion of said bracket member, said tool support member having a clamp pin receiving hole adapted to be aligned with said clamp pin receiving hole in said cross head portion, a tool carrying means carried by said tool support member, a clamp pin extending through said clamp pin receiving hole in said cross head portion of said bracket member, said clamp pin receiving hole in said tool support member being larger than said clamp pin to permit limited adjusting movement of said tool support member relative to said bracket member, said clamp pin having a shank portion and an enlarged head portion, said head portion being disposed to engage said tool support member and, when urged toward said bracket member, to clamp said tool support member to said bracket member, said shank portion of said clamp pin having a transversely extending recess a wall portion of which is inclined to the axis of said clamp pin, and a clamping cam member rotatably supported in said cross head portion of said bracket member and having an eccentric portion disposed at least partially within said recess in said clamp pin, said eccentric portion being adapted, when said cam member is rotated, to engage said inclined wall portion of said recess and move said clamp pin axially to effect a clamping of said flat face portion of said tool support member to said flat face portion of said bracket member.

5. An adjustable tool holder including a bracket member and a tool support member having engaging face portions and having clamp pin receiving holes disposed substantially in alignment, a clamp pin disposed in said clamp pin receiving holes and having a head portion adapted to engage one of said members, one of said clamp pin receiving holes being larger in diameter than said clamp pin, and clamp pin actuating means supported in the other of said members and adapted to move said clamp pin axially in pure lineal travel without rotational movement whereby said members may be releasably clamped together by said head portion of said clamp pin.

6. An adjustable tool holder as defined in claim 2 wherein resilient spring means are interposed between said bracket member and said tool support member tending to urge same apart.

References Cited by the Examiner
UNITED STATES PATENTS

| | | | |
|---|---|---|---|
| 1,980,336 | 11/34 | Hoagland | 279—6 |
| 2,524,852 | 10/50 | Strauss | 279—6 |
| 2,781,199 | 2/57 | Veldhuizen | 279—97 |
| 2,811,365 | 10/57 | Larson | 279—6 |
| 3,036,838 | 5/62 | Barber. | |
| 3,066,560 | 12/62 | Estephanio | 279—6 |

FRANK SUSKO, *Primary Examiner.*

ROBERT C. RIORDON, *Examiner.*